United States Patent [19]

Tanaka et al.

[11] Patent Number: 5,429,876
[45] Date of Patent: *Jul. 4, 1995

[54] COPPER-LEAD BASED BEARING ALLOY MATERIAL EXCELLENT IN CORROSION RESISTANCE AND A METHOD OF PRODUCING THE SAME

[75] Inventors: Tadashi Tanaka, Konan; Masaaki Sakamoto, Nagoya; Koichi Yamamoto, Komaki; Tsukimitsu Higuchi, Gifu, all of Japan

[73] Assignee: Daido Metal Company Ltd., Nagoya, Japan

[*] Notice: The portion of the term of this patent subsequent to Jul. 12, 2011 has been disclaimed.

[21] Appl. No.: 226,312

[22] Filed: Apr. 12, 1994

[30] Foreign Application Priority Data

May 13, 1993 [JP] Japan .................................. 5-111220

[51] Int. Cl.⁶ .............................................. B22F 3/16
[52] U.S. Cl. .................................. 428/553; 428/546; 428/548; 419/5; 419/8; 419/28; 419/29
[58] Field of Search ........................... 419/5, 8, 28, 29; 428/546, 548, 555, 553, 552, 557; 75/208

[56] References Cited

U.S. PATENT DOCUMENTS

| | | | |
|---|---|---|---|
| 3,969,084 | 7/1976 | Watanabe et al. | 29/182.1 |
| 4,069,369 | 1/1978 | Feodor et al. | 428/557 |
| 4,121,928 | 10/1978 | Mori | 75/208 |
| 4,916,026 | 4/1990 | Bergmann et al. | 428/555 |
| 5,328,772 | 7/1994 | Tanaka et al. | 428/548 |
| 5,334,460 | 8/1994 | Tanaka et al. | 428/552 |
| 5,346,668 | 9/1994 | Tanaka et al. | 420/485 |

FOREIGN PATENT DOCUMENTS 4202726 7/1992 Japan .

*Primary Examiner*—Donald P. Walsh
*Assistant Examiner*—John N. Greaves
*Attorney, Agent, or Firm*—Browdy and Neimark

[57] ABSTRACT

Disclosed is a copper-lead based bearing material having excellent corrosion resistance, comprising a steel back metal and a bearing layer of a copper-lead based bearing alloy, the latter consisting essentially, by weight, 0.5 to 10% Bi, 0.5 to 8% Sn, 15 to 30% Pb, 2 to 10% Ni, not greater than 0.2% P, the balance Cu and incidental impurities.

By adding Bi in a copper-lead based bearing alloy it becomes possible to obtain excellent corrosion resistance without impairing the conformability and seizure resistance of the bearing material in comparison with the conventional copper-lead based bearing alloys.

3 Claims, No Drawings

COPPER-LEAD BASED BEARING ALLOY MATERIAL EXCELLENT IN CORROSION RESISTANCE AND A METHOD OF PRODUCING THE SAME

FIELD OF THE INVENTION

The present invention relates to a copper-lead based bearing alloy which is suitable for use in an internal combustion engine and which is excellent in corrosion resistance.

BACKGROUND OF THE INVENTION

Heretofore, a copper-lead based bearing alloy material which has been used for an internal combustion engine has been widely applied to a high-speed, high-load engine. Its compositions are classified into a Cu—Pb alloy, a Cu—Sn—Pb alloy and a Cu—Bi—Pb alloy. Also, it has been known to provide an overlay of a Pb—Sn, Pb—Sn—Cu or Pb—Sn—In alloy on a copper-lead based alloy surface in order to make up for its conformability, seizure resistance, embedability, and corrosion resistance.

The lead contained in a copper-lead based bearing alloy is a metal which satisfies the requirements of conformability, seizure resistance, embedability and the like, but on the other hand it has the disadvantage that it makes the bearing poor in corrosion resistance. Specifically, due to a deterioration of lubricating oil, there is caused the danger of inducing the wear and seizure for the reason of the corrosion of Pb in the copper-lead based alloy. While an alloy is proposed in Japanese Unexamined Patent Publication No. 4-202726 so as to improve the corrosion resistance, the small amount of Pb added thereto does not satisfy the conformability and seizure resistance which are important for a bearing.

OBJECT AND SUMMARY OF THE INVENTION

It is an object of the present invention to provide a copper-lead based bearing alloy material which is excellent in corrosion resistance while improving the foregoing problems.

The present invention has been developed to improve the corrosion resistance and at the same time to enhance seizure resistance of the copper-lead based bearing alloy. Its gist is summarized as follows:

(1) A copper-lead based bearing material for a sliding bearing which is excellent in corrosion resistance, the material comprising a steel back metal layer or a copper-plated steel back metal layer, and a copper-lead based bearing alloy layer, the bearing alloy layer consisting essentially, by weight, of 0.5 to 10% Bi, 0.5 to 8% Sn, 15 to 30% Pb, 2 to 10% Ni, not more than 0.2% P and the balance Cu and incidental impurities.

(2) A copper-lead based bearing alloy material which is excellent in corrosion resistance and which is set forth in (1) in which the copper-lead based bearing alloy further contains 0.05 to 1.5% B.

(3) A method of producing a copper-lead based bearing material which is excellent in corrosion resistance and which is set forth in (1) or (2), the method comprising the steps of dispersing a copper-lead based alloy powder or copper-lead based mixed powder upon the steel back metal or copper-plated steel back metal and repeating the sintering and the rolling of the said powder upon the metal.

Hereinafter the reasons of the limitations set forth in the foregoing and their functions and effects will be explained.

(1) COPPER-LEAD BASED BEARING ALLOY

(a) Bi: 0.5 to 10%

Bi is contained as a component which imparts the corrosion resistance to the copper-lead based bearing alloy. However, it has little effect if the content thereof is less than 0.5%, while it causes the problem in heat resistivity if the content thereof exceeds 10%. A preferable range of Bi is 1 to 8%, and the most preferable range thereof is 2 to 4%.

(b) Sn: 0.5 to 8%

Sn is contained as a component which imparts the strength to the copper-lead based bearing alloy. However, it makes the copper-lead based bearing alloy insufficient in strength if the content thereof is less than 0.5% and, if the content thereof exceeds 8%, it makes the copper-lead based bearing alloy excessively strong and its thermal conductivity reduced, so that the seizure resistance becomes inferior. A preferable range of Sn is 0.5 to 7%, and the most preferable range thereof is 1 to 4%.

(c) Pb: 15% to 30%

Pb is contained as a component which imparts the seizure resistance to the bearing and the embedability of foreign matters. However, it makes the copper-lead based bearing alloy insufficient in the embedability of foreign matters if the content thereof is less than 15% and, if the content thereof exceeds 30%, it reduces the strength of the copper-lead based bearing alloy, so that the fatigue resistance becomes inferior. A preferable range of Pb is 17 to 27%, and the most preferable range thereof is 20 to 25%.

(d) P: not more than 0.2%

P is contained as a component which imparts a hardness to the copper-lead based bearing alloy. However, if the content thereof exceeds 0.2%, it makes the copper-lead based bearing alloy excessively hardened, so that the conformability thereof to a shaft becomes inferior.

(e) Ni: 2 to 10%

Ni is contained as a component which imparts a strength to the copper-lead based bearing alloy. However, if the content thereof is less than 2%, there occurs little effect for strengthening the copper-lead based bearing alloy and, if the content thereof exceeds 10%, it makes the copper-lead based bearing alloy excessively hardened, so that the conformability is reduced. A preferable range of Ni is 3 to 9%, and the most preferable range thereof is 4 to 8%.

(f) B: 0.05 to 1.5%

B is contained as a compound combining with Ni to contribute to the enhancement of the strength and the wear resistance of the copper-lead based bearing alloy. If the content thereof is less than 0.05%, it has no appreciable effect and, if the content thereof exceed 1.5%, it makes the copper-lead based bearing alloy excessively hardened, so that its toughness is impaired. A preferable range of B is 0.1 to 1.3%, and the most preferable range thereof is 0.2 to 1.0%.

PREFERRED EMBODIMENTS OF THE INVENTION

Hereinafter, specific embodiments of the present invention are described.

A copper-lead based alloy powder (having grain size not more than 250 μm) of each composition shown in table 1 was dispersed to thereby provide a powder layer of 700 μm in thickness upon a steel back metal (of SPCC having a thickness of 1.3 mm) which had been copper-plated to have a thickness of 5 μm and it was sintered at a temperature of 700° to 900° C. in a reducing atmosphere for a period for 10–30 minutes and then was subjected to rolling upon the metal, which reducing atmosphere was prepared by $H_2$ gas. Thereafter, the sintering and the rolling are effected again to obtain bimetals having a steel back metal having a thickness of 1.25 mm and Cu—Pb alloy layer having a thickness of 0.35 mm, as products of the present invention (No. 1 to No. 7). Although the alloy powder was employed as the copper-lead based powder, it is also possible to use a powder of mixture of Cu and Pb. Each bimetal was cut to have a width of 25 mm and a length of 50 mm, and the alloy surface was finished to have a flat bearing alloy surface to thereby provide a test piece which was then subjected to a corrosion test.

The test condition is such that a deteriorated lubricating oil occurring after the taxi's run of 10,000 km was used and each test piece was immersed in this lubricating oil at 130° C., and an amount of corrosion occurring after 1000 hours of this immersion was measured.

The amount of corrosion was expressed as a numeral value which represents a weight difference before and after the test of each test piece. Its results are shown in Table 2. Further, in order to confirm the seizure resistance of a product according to the present invention, a semi-spherical bearing was used as a sample. The test conditions are such that after exposed to an initial driving of a test device for 1 hour, the static loads were cumulatively increased under the conditions set forth in Table 3 and when the rear temperature of the bearing exceeded 200° C. or the driving electric current of the motor showed an abnormality, it was judged that a seizure took place. The surface pressures before such seizures took place (maximum surface pressures without a seizure) are shown in Table 4. In this test, although an overlay was not applied to the bimetal so as to make it possible to clearly evaluate the corrosion resistance of a copper-lead based bearing alloy, an overlay of Pb—Sn, Pb—Sn—Cu, Pb—Sn—In or the like may be provided. When an overlay is provided, an intermediary layer of Ni may be provided between the copper-lead based bearing alloy layer and the overlay to prevent Sn and In in the overlay from diffusing into the copper-lead based bearing alloy.

From the test results shown in Table 2, it is evident that, when samples No. 2 and No. 9 both containing compositions similar to each other are compared, No. 2 according to the present invention in which 2% Bi was added has an corrosion amount reduced by ½ in comparison with No. 9 representing a comparative example in which no Bi is added. Hence the effect of Bi is clear. Also, when No. 6 is compared with No. 10, it is seen that No. 6 representing a product according to the present invention in which 1% Bi is added is evidently superior in the corrosion resistance compared with No. 10 representing a comparative example in which no Bi is added. Further, the effect of Bi is evident in the comparison of No. 7 representing a product according to the present invention with No. 11 representing a comparative example.

It is noted from the seizure test results shown in Table 4 that the seizure resistance of a product according to the present invention is similar to those of the comparative examples.

From the foregoing explanation, it is seen that as compared with the conventional copper-lead based bearing alloys, the copper-lead based bearing alloy according to the present invention containing Bi by the prescribed amount exhibits excellent corrosion resistance without impairing the conformability and the seizure resistance.

TABLE 1

| Kind | No. | Chemical components of Copper-Lead based Bearing Alloys (weight %) | | | | | |
|---|---|---|---|---|---|---|---|
| | | Cu | Sn | Pb | Ni | B | Bi |
| Products of Invention | 1 | Balance | 0.5 | 25 | 2 | — | 2 |
| | 2 | Balance | 1.5 | 23 | 4 | — | 2 |
| | 3 | Balance | 1.5 | 23 | 4 | 0.4 | 2 |
| | 4 | Balance | 1.5 | 23 | 7.5 | 1 | 1 |
| | 5 | Balance | 1.5 | 23 | 7.5 | 1 | 4 |
| | 6 | Balance | 3.5 | 23 | 2 | — | 1 |
| | 7 | Balance | 7 | 19 | 2 | — | 1 |
| Comparative Products | 8 | Balance | 0.5 | 25 | — | — | — |
| | 9 | Balance | 1.5 | 22 | — | — | — |
| | 10 | Balance | 3.5 | 23 | — | — | — |
| | 11 | Balance | 7 | 19 | — | — | — |

TABLE 2

| Kind | No. | Amount of Corrosion (mg/cm$^2$) |
|---|---|---|
| Products of Invention | 1 | 8 |
| | 2 | 8 |
| | 3 | 7 |
| | 4 | 7 |
| | 5 | 5 |
| | 6 | 9 |
| | 7 | 5 |
| Comparative Products | 8 | 18 |
| | 9 | 16 |
| | 10 | 14 |
| | 11 | 13 |

TABLE 3

| Item | Conditions | Unit |
|---|---|---|
| Shaft diameter | 53 | mm |
| Bearing width | 13 | mm |
| Rotational speed | 2000 | rpm |
| Circumferential speed | 5.6 | m/sec |
| Lubricating oil | SAE20 | — |
| Oil inlet temp. | 98–102 | °C. |
| Rate of oil supply | 20 | ml/min |
| Shaft material | S55C | |
| Roughness of mating material | 1.0 | Rmax μm |

TABLE 4

| Kind | No. | Max. Surface Pressure without seizure (kgf/cm$^2$) |
|---|---|---|
| Products of Invention | 1 | 850 |
| | 2 | 800 |
| | 3 | 800 |
| | 4 | 800 |
| | 5 | 800 |
| | 6 | 800 |
| | 7 | 750 |

TABLE 4-continued

| Kind | No. | Max. Surface Pressure without seizure (kgf/cm$^2$) |
| --- | --- | --- |
| Comparative Products | 8 | 800 |
|  | 9 | 800 |
|  | 10 | 800 |
|  | 11 | 750 |

What is claimed is:

1. A copper-lead based bearing alloy material having excellent corrosion resistance, comprising a layer of a steel back metal or a copper-plated steel back metal, and a bearing layer of a copper-lead based alloy bonded to said steel back metal, said bearing layer of a copper-lead based alloy consisting essentially, by weight, of 0.5 to 10% Bi, 0.5 to 8% Sn, 15 to 30% Pb, 2 to 10% Ni, not more than 0.2% P and the balance Cu and incidental impurities.

2. A copper-lead based bearing alloy material having excellent corrosion resistance as set forth in claim 1, wherein said bearing layer of the copper-lead based alloy further contains 0.05 to 1.5% by weight of B.

3. A method of producing a copper-lead based bearing alloy material having excellent corrosion resistance as set forth in claim 1 comprising the steps of: dispersing a copper-lead based alloy powder or a powder mixture comprising copper and lead on the steel back metal or copper-plated steel back metal, sintering said dispersed powder, rolling said dispersed powder upon the metal, and repeating said sintering and rolling steps.

* * * * *